(12) United States Patent
Mani

(10) Patent No.: US 7,128,339 B2
(45) Date of Patent: Oct. 31, 2006

(54) AUTOMOTIVE KNEE BOLSTER INSTALLATION AND METHOD OF CONSTRUCTION

(75) Inventor: Ayyakannu Mani, Troy, MI (US)

(73) Assignee: Indus Concept & Engineering LLC, Troy, MI (US)

( * ) Notice: Subject to any disclaimer, the term of this patent is extended or adjusted under 35 U.S.C. 154(b) by 309 days.

(21) Appl. No.: 10/683,173

(22) Filed: Oct. 10, 2003

(65) Prior Publication Data

US 2006/0131860 A1    Jun. 22, 2006

Related U.S. Application Data

(60) Provisional application No. 60/417,431, filed on Oct. 10, 2002.

(51) Int. Cl.
*B60R 21/045*    (2006.01)

(52) U.S. Cl. ........................ 280/752; 280/748

(58) Field of Classification Search ........... 280/752, 280/751, 748, 732, 728.2, 730.1
See application file for complete search history.

(56) References Cited

U.S. PATENT DOCUMENTS

| | | | | |
|---|---|---|---|---|
| 3,850,447 | A * | 11/1974 | Nagazumi et al. | 280/752 |
| 5,096,223 | A * | 3/1992 | Tekelly et al. | 280/748 |
| 5,273,314 | A * | 12/1993 | Sakakibara | 280/752 |
| 6,145,880 | A * | 11/2000 | White et al. | 280/752 |
| 6,609,727 | B1 * | 8/2003 | Figlioli et al. | 280/752 |
| 6,702,324 | B1 * | 3/2004 | Shimoyamada et al. | 280/752 |
| 6,948,738 | B1 * | 9/2005 | Garnweidner et al. | 280/752 |
| 2003/0184070 | A1 * | 10/2003 | Vidal et al. | 280/752 |
| 2004/0056463 | A1 * | 3/2004 | Marks et al. | 280/752 |
| 2005/0194773 | A1 * | 9/2005 | Yamada et al. | 280/752 |

* cited by examiner

*Primary Examiner*—David R. Dunn
*Assistant Examiner*—Drew J. Brown
(74) *Attorney, Agent, or Firm*—John R. Benefiel

(57) ABSTRACT

A knee bolster installation for an automotive vehicle includes a bridge plate extending across a space receiving a steering column in front of the driver's knee and having a knee impact absorber structure attached behind each end of the bridge plate. Each knee impact absorber structure has diverging front and back walls having a curve top wall and a curved intermediate web extending between the front and back walls, and a curved bottom connecting the lower end of front and back walls together. A horizontal stabilizer web connects the top wall and intermediate web together to restrain bulging when crushed to avoid horizontal collapse thereof during deformation. Offset openings in each of the top wall, intermediate web, and bottom wall form wider curved strips at the inside adjacent the steering column space so that the front of the outside ends of the knee installation absorber structures are inclined away from the steering column space when deformed by knee impact. The knee installation absorber structures are preferably extruded and the openings thereafter cut into the top wall, intermediate web and bottom wall.

9 Claims, 5 Drawing Sheets

AUTOMOTIVE KNEE BOLSTER INSTALLATION AND METHOD OF CONSTRUCTION

CROSS REFERENCE TO RELATED APPLICATION

This application claims the benefit of U.S. provisional Ser. No. 60/417,431, filed Oct. 10, 2002.

BACKGROUND OF THE INVENTION

This invention concerns so called "knee bolsters", which are structures installed in automotive vehicles forward of the driver's seat positioned to be engaged by the driver's knees if the person submarines below the steering wheel mounted air bag during a collision.

Knee bolsters sometimes employ crushable or deformable impact absorbing structures which restrain the driver by contact by his or her knees, the crushing of the structure absorbing the energy of the person's momentum over a range of deformation to lower the stress on the person's knees and the load transmitted to the thigh bone.

Deformable structure knee bolsters are designed to be crushed by the person as the person is decelerated by the collision in order to reduce or prevent injury to the person.

Another requirement is the prevention of damage to or interference with the steering column mechanism during crushing of the knee bolster impact absorbing structure so as to allow the steering column to steer axially and absorb the upper body impact and to allow steering control to be maintained after a collision, if possible.

Costs are always a problem in automotive design, and the knee bolsters have sometimes been assembled from a number of components, representing an assembly cost.

Large aluminum sections have been proposed to be extruded to eliminate assembly costs, with portions cut out from the large extrusions. Large extrusions are themselves costly such that these structures are still somewhat expensive to manufacture.

Other knee bolsters have involved crush cells which have curved webs which are deformed, but such webs have a geometry which results in a buckling collapse of the web, greatly reducing the structure's ability to absorb energy. This can result in a great reduction in the restraining resistance of the structure. Such collapse can also produce gross bulging which can interfere with proper operation of the steering mechanism. Also, such a collapse mode can cause the surface impacted by the knees to directly hit the steering column and hinder the proper functioning of the steering column.

It is the object of the present invention to provide a deformable structure type knee bolster which is low in cost yet reliably providing adequate resistance to deformation over a range of crushing movement and prevents the development of any interference with the steering column mechanism.

SUMMARY OF THE INVENTION

The above objects and others which will become apparent upon a reading of the following specification and claims are achieved by a knee bolster comprised of a right and left laterally spaced knee impact absorber deformable structures fixed on a respective side of the steering column by a knee engagement plate bridging the space between the knee structures.

Each knee impact absorber structure is a section extruded from plastic, aluminum or other extrudable material comprised of an outer wall having generally planar front and back sides extending in a generally V-shape, with the lower end of the divergent front side and a back side connected by a curved bottom. A double curved top connects the upper ends of the front and back sides. A vertical stabilizer web connected to the double curved top wall extends down to an intermediate double curved web extending between the back and front sides at an intermediate height. A series of openings are cut into the top, intermediate, and bottom sides to create inner and outer strips.

This geometry creates an upper stabilizer comprised of a pair of crush cells having curved top and bottom sets of strips connecting each of the upper part of the back and front sides of the structure to a respective side of the horizontal stabilizer web.

A lower stabilizer is formed by the curved bottom strips and the lower part of the back and front sides.

The left and right knee impact absorber structures are connected to either end of a separately formed flat bridge plate which is located at the front of the bolster to be engaged by the driver's knees when a collision occurs.

Sets of inner strips adjacent a space through which the steering column passes are wider than outer strips adjacent the outer side, the slope outwardly away from the steering column so that the front and back walls are collapsed together at their outer sides when the knees force the bridge plate to bend to deform the knee impact absorber structures, creating a wedge shape guiding the knees away from the center and avoiding the intrusion of any part of the deformed knee structures into the area where the steering column passes.

Outward buckling collapse of the outer strips is prevented by the restraining effect of the upper stabilizer web so that resistance to deformation is sustained throughout the crush event.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
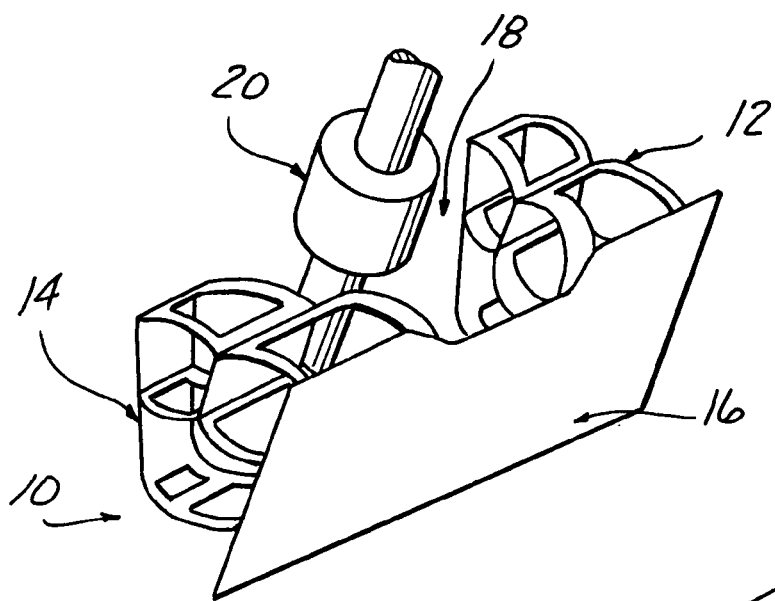
FIG. 1 is a pictorial view of a complete knee bolster installation according to the invention.
Figure 1A:
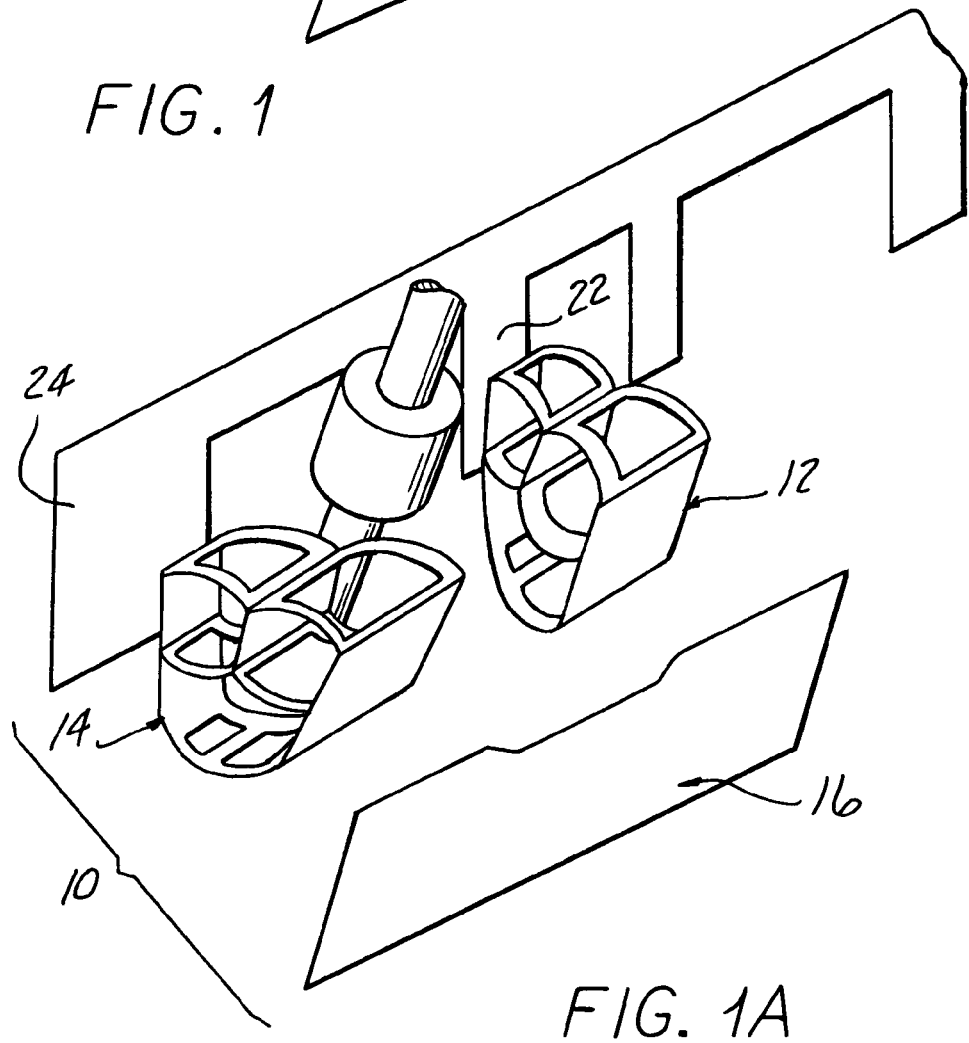
FIG. 1A is an exploded pictorial view of the knee bolster installation shown in FIG. 5.

Referring to the drawings, and particularly FIGS. 1 and 1A, the knee bolster 10 according to the present invention includes a right knee impact absorber structure 12 and a left knee impact absorber structure 14, both attached to a respective end of a bridging plate 16 extending between the driver's seat and the structures 12 and 14 and facing the driver's knees. A space 18 between the absorber structures 12, 14 accommodates the steering column 20 of the vehicle in which the knee bolster 10 is installed.

The absorber structures 12 and 14 are each restrained by vehicle body structure 22, 24 depicted diagrammatically forward of the knee bolster 10.

Figure 2:
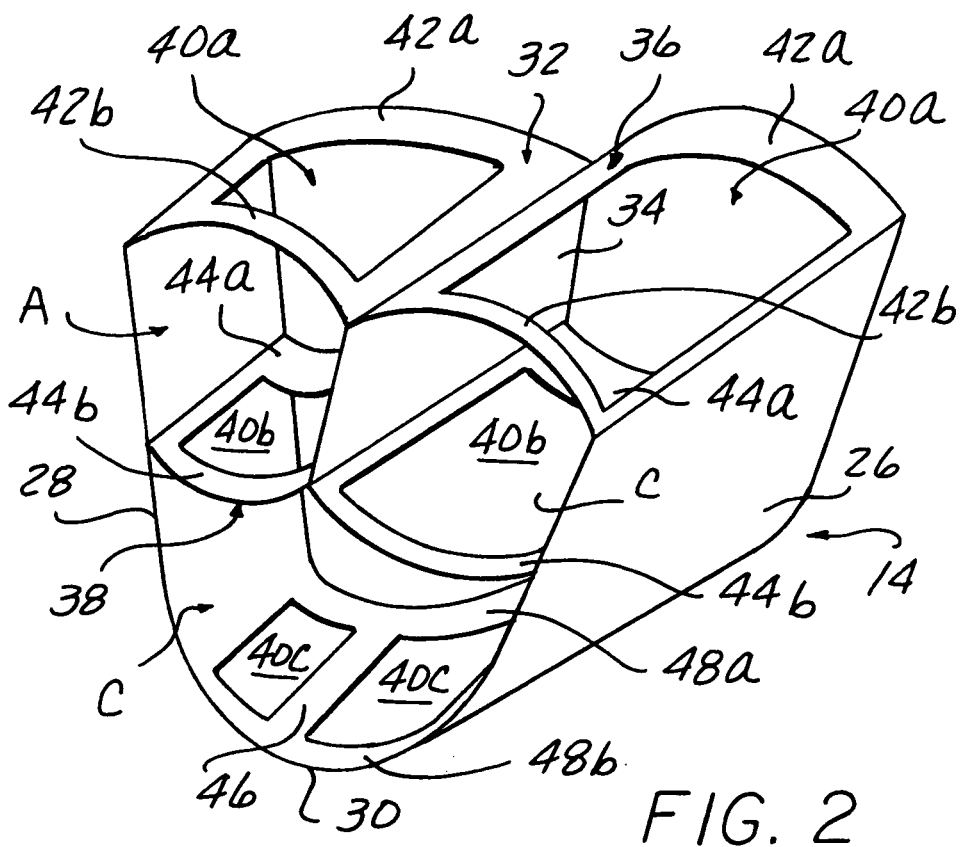
FIG. 2 is an enlarged pictorial view of the left knee impact absorber structure used in the knee bolster according to the invention.
Figure 4:
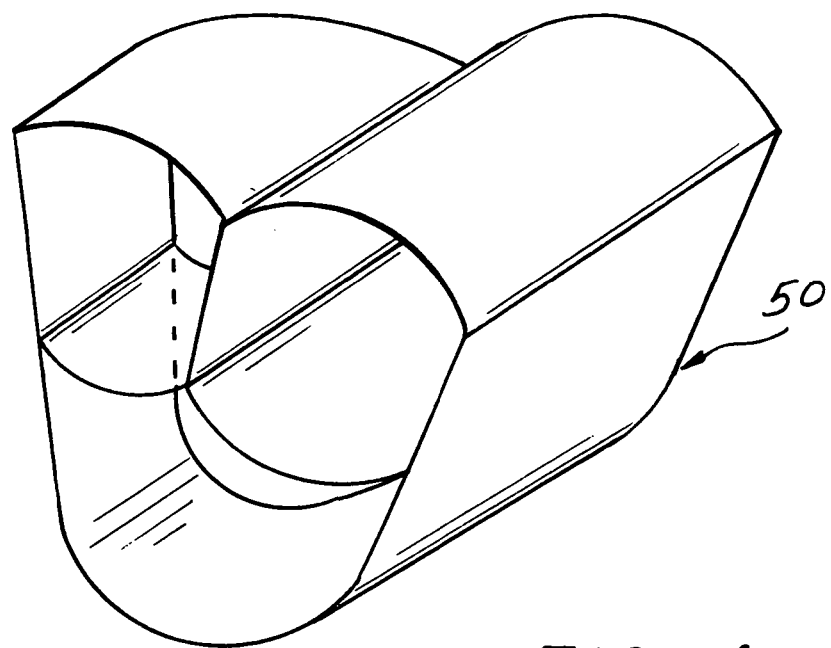
FIG. 4 is a pictorial view of a preform used to construct the knee impact absorber structure shown in FIG. 2.

FIG. 2 shows details of the left knee impact absorber structure 14. The knee impact absorber structures 12 and 14 need not be identical, as differing crush characteristics thereof are sometimes necessary or desirable, but are contemplated as having the same general configuration according to the present invention.

The left impact absorber structure 14 has a wider front wall 26 and a narrower back wall 28 which are spaced apart and extend generally vertically but which diverge from each other in the direction towards their upper ends as shown in the drawings. The lower ends thereof are connected together by a curving bottom wall 30.

At their upper ends, the front and back walls 28, 30 are connected together by a curved top wall 32 having two curved segments. A vertical stabilizer web 34 extends vertically down from the joint 36 between the curved segments of the top wall 32 to an intermediate wall 38, also having two curved segments forming a pair of connected upper crush cells A and B. Each of the top, intermediate and bottom walls 32, 38, 30 are pierced and cut to form pairs of openings 40a, 40b, 40c, therein. These openings can be of any shape and can incorporate rounded corners.

These openings are offset to the left to create outwardly curved top side strips 42a at the right side of adjacent the space 18 which are wider than similar intermediate curved strips 42b at the left.

Intermediate curved strips 44a, 44b are formed in the intermediate wall 38 by openings 40b, with right side strips 44a adjacent the space 18 wider than the left side strips 44b.

A lower crush cell C is formed by the outwardly curved bottom wall 30, the lower portions of the front and back walls 28, 30, and the curved strips 44.

A strip 46 between the openings 40c provides a stabilizer function for bottom curved side strips 46a, 46b.

Figure 3A:
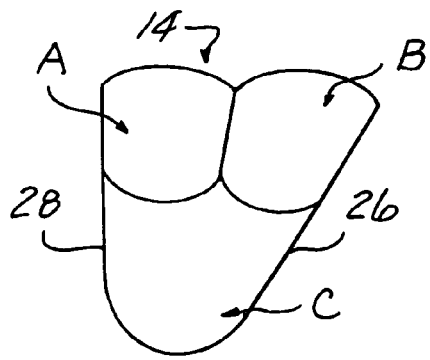
FIG. 3A is a side view of the knee impact absorber structure shown in FIG. 2.
Figure 3B:
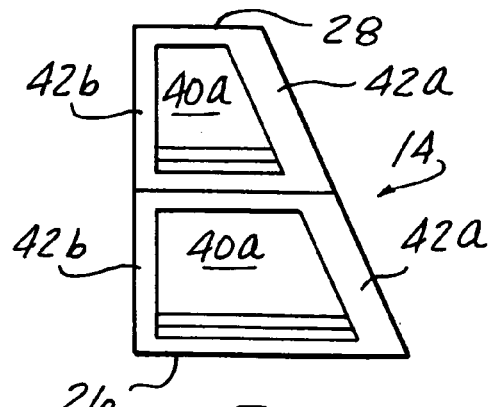
FIG. 3B is a top view of the knee impact absorber structure shown in FIG. 2.
Figure 3C:
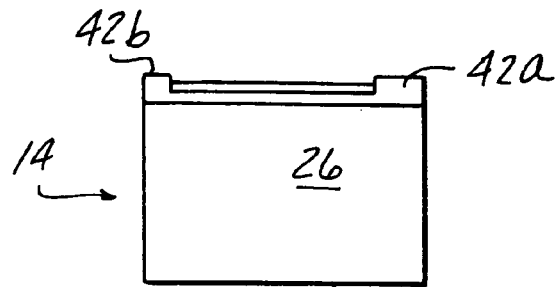
FIG. 3C is a front view of the knee impact absorber structure shown in FIG. 2.

As best seen in FIG. 3b, the inner side, closest to the space 18, is angled so that the front wall 26 is substantially wider than the back wall 28.

Figure 5A:
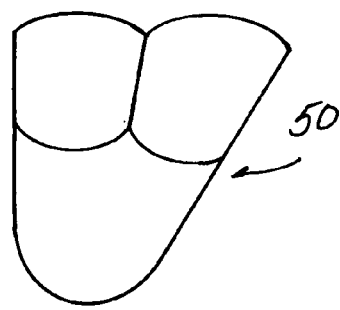
FIG. 5A is a side view of the preform shown in FIG. 4.
Figure 5B:
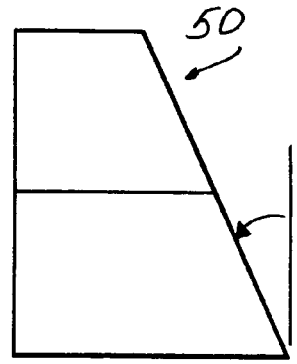
FIG. 5B is a top view of the preform shown in FIG. 4, with an indication of the angle from front to rear of the inner side thereof.
Figure 5C:
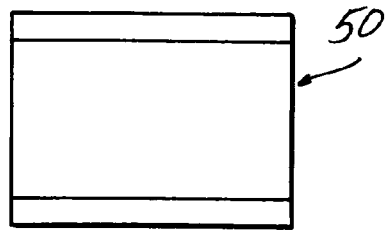
FIG. 5C is a front view of the preform shown in FIG. 4.

FIGS. 4 and 5A–5C show a preform 50 from which the knee impact absorber structures 12, 14 can be made from an extrusion, and by piercing or drilling or cutting (laser beam, water jet, for example) the various openings, and cutting the angled inside as indicated in FIG. 5B.

Figure 6A:
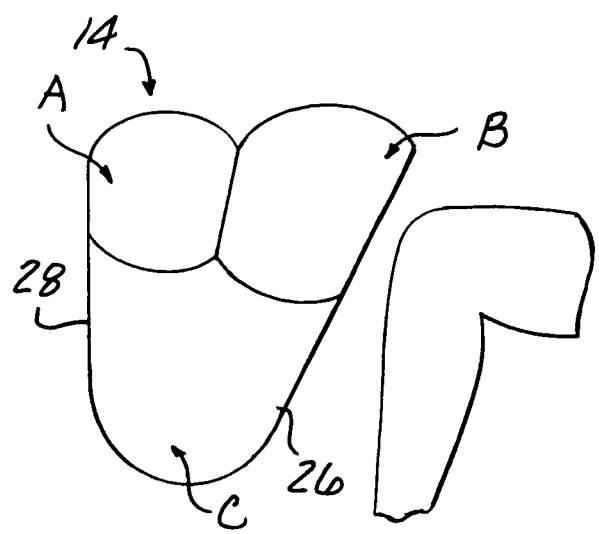
FIG. 6A is a diagram showing a side view of one of the knee impact absorber structures and a juxtaposed knee of the driver prior to impact.
Figure 6B:
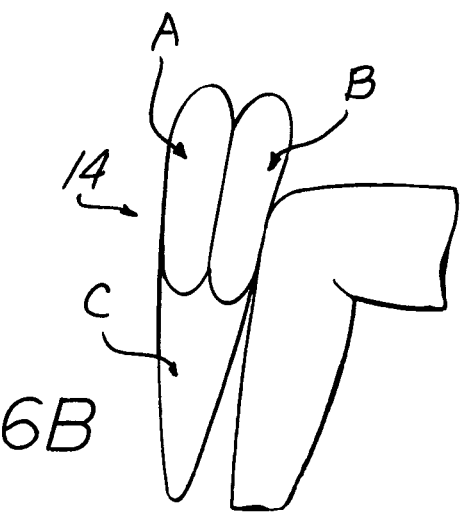
FIG. 6B is a diagram according to FIG. 6A depicting the after deformed condition of the knee impact absorber structure.

FIGS. 6A and 6B show the controlled deformation of the left and right knee impact absorber structures 12 and 14 occurring during a knee impact event, with the diverging front, and rear walls 26, 28 swinging together to crush the A, B, and C cells, the curved strips 42, 44, 48 bowing together.

The outer end of the front wall 26 is pushed back by deformation of the attached portion of the bridge plate 16.

The outer end of the front walls 26 pushed back by deformation of the attached portion of the bridge plate 16.

This creates an outwardly angled surface guiding the driver's knees away from the steering column space 18. The wider inside strips 42a, 44a, 48a restraining deformation thereof to create the angled deformation shown.

Figure 8:
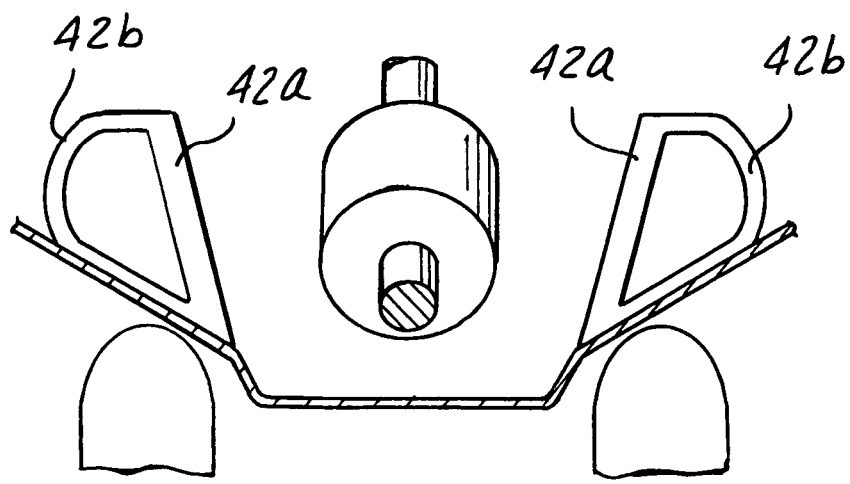
FIG. 8 is a diagrammatic depiction of the after impact condition of the knee impact absorber structure if the horizontal stabilizer web is omitted.
Figure 7A:
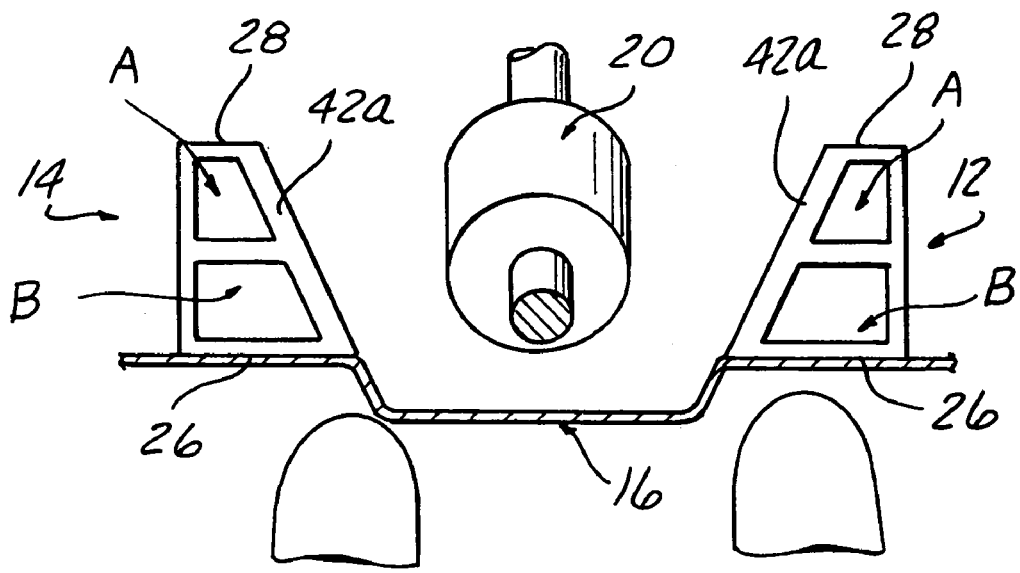
FIG. 7A is a plan view diagram of the knee bolster according to the invention depicting a driver's knee and the steering column prior to impact.
Figure 7B:
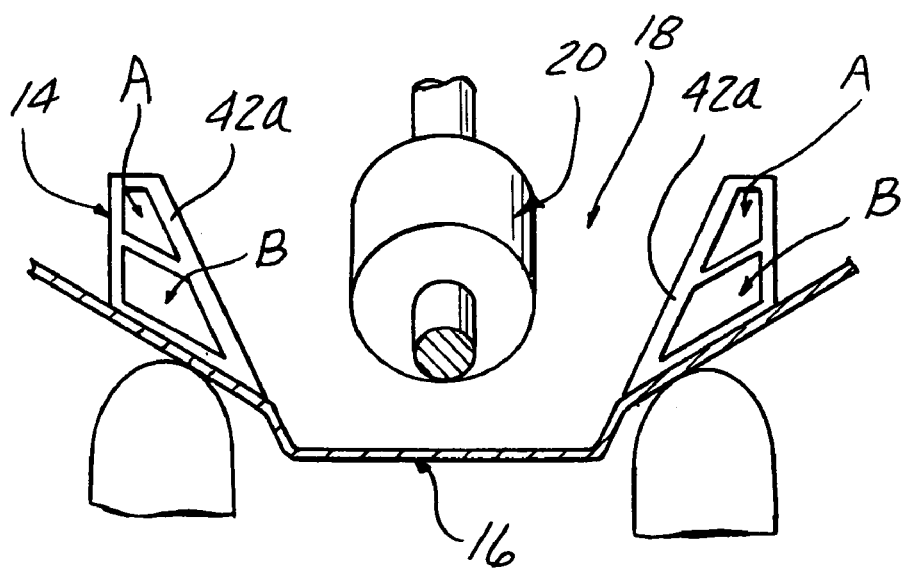
FIG. 7B is a diagram according to FIG. 7A depicting the after impact condition of the knee impact absorber structure.

The stabilizer webs 34, 46 restrain outward bulging of the strips 42b, 44b, 48b to prevent collapse which would otherwise occur, as shown in FIG. 8 without the stabilizer webs. This insures a controlled resistance through the range of deformation without a buckling collapse which if occurring would limit the absorption of the kinetic energy of the driver.

Thus, a simple low cost but quite effective knee bolster installation is provided.

The invention claimed is:

1. A vehicle knee bolster installation for an automotive vehicle comprising:
   a bridging plate adapted to extend across a space accommodating a vehicle steering column, said bridging plate positioned facing a driver's knees;
   a pair of spaced apart knee impact absorber structures each attached to said bridging plate on either side of said steering column and interposed between said bridging plate and fixed vehicle structure forward of said steering column space;
   each of said knee impact absorber structures comprising a front and a back wall each generally planar and extending generally vertically, said front wall attached to said bridge plate, a curved top wall connecting upper ends of said front and back walls; and
   a curved bottom wall connecting bottom ends of said front and back walls, and a curved intermediate web connecting said front and back walls at an intermediate location thereof;
   a vertical stabilizer web located between said front and back walls and extending across the width thereof connecting said curved top wall and said carved intermediate web to form two crush cells to restrain excessive bulging and collapse of said top wall and intermediate web thereof upon impact; and,
   said curved top wall and intermediate web double curved, each having separate curved portions between said vertical stabilizer web and said front and back walls respectively.

2. The knee bolster installation according to claim 1 wherein each of said knee impact absorber structures are wider in the front adjacent said bridging plate than the back adjacent said fixed vehicle structure to have a front to back angled shape.

3. The knee bolster installation according to claim 1 wherein each of said knee impact absorber structures are extruded from a metal.

4. The knee bolster installation according to claim 1 wherein each of said knee impact absorber structures are extruded from a plastic.

5. The knee bolster installation according to claim 1 wherein said top wall is curved upwardly and said bottom wall is curved downwardly.

6. The knee bolster installation according to claim 1 wherein said front and back walls diverge outwardly from each other from said connected bottom ends thereof.

7. A vehicle knee bolster installation for an automotive vehicle comprising:
- a bridging plate adapted to extend across a space accommodating a vehicle steering column, said bridging plate positioned facing a driver's knees;
- a pair of spaced apart knee impact absorber structures each attached to said bridging plate on either side of said steering column and interposed between said bridging plate and fixed vehicle structure forward of said steering column space;
- each of said knee impact absorber structures comprising a front and a back wall each generally planar and extending generally vertically, said front wall attached to said bridge plate, a curved too wall connecting upper ends of said front and back walls; and
- a curved bottom wall connecting bottom ends of said front and back walls, and a curved intermediate web connecting said front and back walls at an intermediate location thereof;
- a vertical stabilizer web located between said front and back walls and extending across the width thereof connecting said curved top wall and said curved intermediate web to form two crush cells to restrain excessive bulging and collapse of said top wall and intermediate web thereof upon impact; and,
- openings formed in said top wall, intermediate web, and bottom wall forming curved strips therein adjacent each end thereof.

8. The knee bolster installation according to claim 7 wherein said openings are located so that curved strips adjacent said steering column space are wider than curved strips adjacent outside ends of said front and back walls of said knee impact absorber structures.

9. A method of constructing the knee bolster recited in claim 7 wherein said knee impact absorber structures are each extruded from an extrudable material and said openings are thereafter cut into said curved top side, curved intermediate web and curved bottom.

* * * * *